United States Patent [19]
Ruckwardt

[11] Patent Number: 5,310,225
[45] Date of Patent: May 10, 1994

[54] CLAMPING CONNECTION MADE OF PLASTIC

[75] Inventor: Hans-Werner Ruckwardt, Eisenberg, Fed. Rep. of Germany

[73] Assignee: TRW United Carr GmbH & Co., K G, Alsenborn, Fed. Rep. of Germany

[21] Appl. No.: 53,719

[22] Filed: Apr. 27, 1993

[30] Foreign Application Priority Data

May 19, 1992 [DE] Fed. Rep. of Germany ....... 4216518

[51] Int. Cl.⁵ ............................................. F16L 37/10
[52] U.S. Cl. .................... 285/308; 285/314; 285/358; 285/394
[58] Field of Search ............. 285/308, 314, 358, 359, 285/394, 395

[56] References Cited

U.S. PATENT DOCUMENTS

| | | | |
|---|---|---|---|
| 3,083,042 | 3/1963 | Collar | 285/314 X |
| 3,191,972 | 6/1965 | Collar | 285/314 X |
| 4,513,998 | 4/1985 | Grossauer | 285/308 |
| 4,577,894 | 3/1986 | Wake | 285/395 X |

FOREIGN PATENT DOCUMENTS 3924375  1/1991  Fed. Rep. of Germany ...... 285/308

*Primary Examiner*—Randolph A. Reese
*Assistant Examiner*—Heather Chun
*Attorney, Agent, or Firm*—Fay, Sharpe, Beall, Fagan, Minnich & McKee

[57] ABSTRACT

A releasable connection made of plastic includes a sleeve-shaped central body having a first end connectable with a tube-shaped part and a second end axially receiving a junction piece having a circumferentially extending clamping rib. A rotatable clamping sleeve encircles the second end of the central body. The central body includes at least two radially deflectable resilient locking tabs with a cam surface on the interior of the clamping sleeve acting to selectively deflect the locking tabs radially inward to engage the junction piece. A first of the tabs is located to engage closely adjacent the clamping rib to prevent axial withdrawal of the junction piece and a second of the tabs is located at a position axially spaced from the first tab to radially position and stabilize the junction piece in the central body.

19 Claims, 3 Drawing Sheets

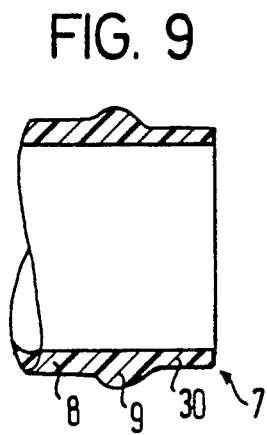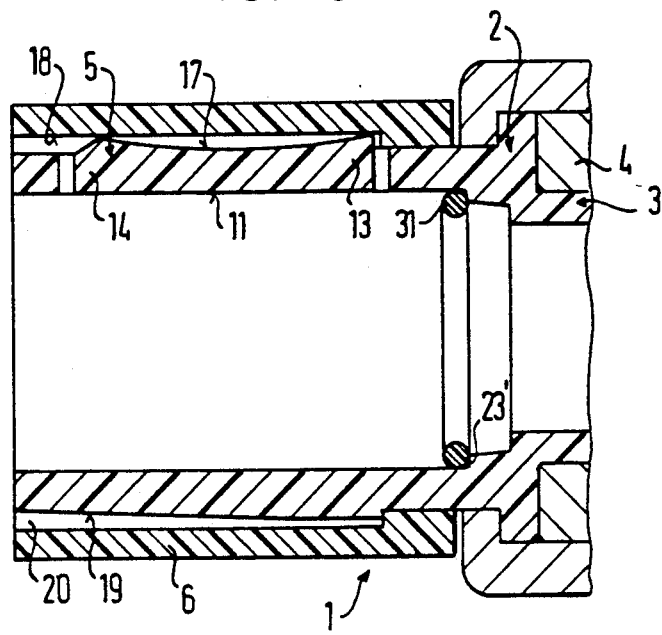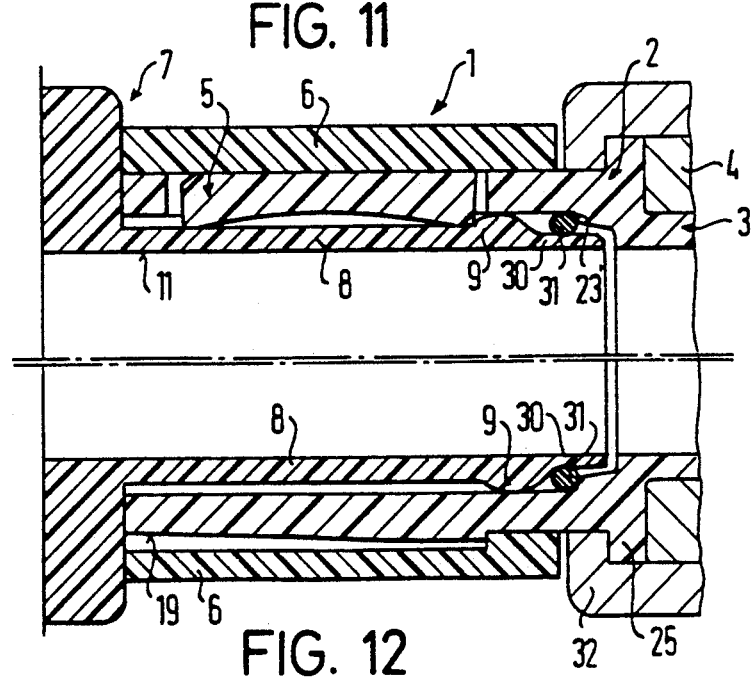

CLAMPING CONNECTION MADE OF PLASTIC

BACKGROUND OF THE INVENTION

The subject invention relates to a releasable clamping type connection made of plastic having a sleeve-shaped central body which is connectable at a first terminal zone with a tubular part, such as a tube or hose, and at a second terminal zone with a junction piece. The sleeve-shaped body carries a rotatable clamping sleeve. Between the outer circumference of the sleeve-shaped body and the inner circumference of the clamping sleeve there is arranged at least one bayonet-shaped locking piece.

The generally known state of the art is to functionally and safety connect tube or hose sections by means of a clamping connector which is made of plastic and includes a rotatable clamping sleeve which acts upon bayonet-shaped locking pieces to move them radially from an open position to a closed position.

It is the objective of the present invention to improve such a clamping connector in such manner that with a simple construction there is guaranteed a perfect and secure holding of the tube-shaped parts being coupled.

BRIEF SUMMARY OF THE INVENTION

The noted task is solved according to the invention in that the sleeve-shaped central body carries at least two locking pieces or tabs which are spaced over the circumference and are resiliently adjustable relative to the inner wall via the clamping sleeve. In the closed position, in each instance, one zone of each locking tab locks the connection piece via a "click-stop" connection, while another zone adjusts and locates the junction piece. This results in the benefit of a simply constructed clamping connection wherein the locking pieces perform dual functions. Namely, on the one hand, in accordance with their function, they lock against axial separation and, on the other hand, they simultaneously carry out a radial stabilization and adjustment of the components.

In order to have the clamping connection fluid tight, for example during passage of water, oil, or other media, the sleeve-shaped central body can carry a sealing ring on the interior in front of the locking pieces at a location where it is frontally acted upon by the junction piece. The sealing ring can be designed as a single additional piece, or it can be produced with the sleeve-shaped central body by a two component extrusion process. In this connection, a first terminal zone on the interior of the sleeve-shaped central body may have a circumferential groove for receiving the sealing ring.

According to a further refinement of the invention, the junction piece of the clamping connection can include a hollow cylinder that is insertable in the second terminal zone of the sleeve-shaped central body. The frontal portion of the hollow cylinder includes a bulge or rib positioned such that in the closed position, its front acts upon the sealing ring and its posterior zone forms a portion of the click-stop connection in concert with the neighboring zone of the locking tabs. In this arrangement, the bulge or rib of the junction piece may beneficially be arranged to extend circumferentially.

According to another aspect of the invention, the construction of the locking pieces is such that the wall of the sleeve-shaped element is undercut in L-shaped manner on opposite sides. The upper side of the respectively undercut zone in the open, unstressed position has a configuration which is convex and dish-shaped. In the closed position, the clamping sleeve resiliently abuts the inner wall to stress and deflect it to thus form the two terminal zones. Thus, a type of "click" effect of the locking tabs is achieved whereby the deflection deforms the two terminal zones. Thus, there is carried out, on the one hand, the adjustment and stabilization, and on the other hand, the locking process.

According to a further refinement of the invention, assembly is facilitated because the sleeve-shaped central body may carry at its outer circumference at least two insertion slants which act in concert with the interior wall of the clamping sleeve. The insertion slants are respectively arranged next to the locking pieces. Furthermore, the clamping sleeve may have recesses adapted to the locking pieces. In such an arrangement, the length of the recesses is preferably respectively adapted to the common circumferential length of the locking piece and the neighboring insertion slant.

BRIEF DESCRIPTION OF THE DRAWINGS

The above and other objects and advantages will become apparent from the following description when read in conjunction with the accompanying drawings wherein:

FIG. 9 is a longitudinal cross-section of a modified form of the connecting rib or bulge on the junction piece;

FIG. 10 is a longitudinal cross-section of a modified form of the clamping connector before insertion of the associated junction piece;

FIG. 11 is a longitudinal cross-section of the fully assembled clamping connector of the modified form according to FIGS. 9 and 10; and, FIG. 12 is a view like FIG. 11 showing another variation of the invention in its fully assembled condition.

DETAILED DESCRIPTION OF THE PREFERRED AND ALTERNATE EMBODIMENTS

Figure 1:
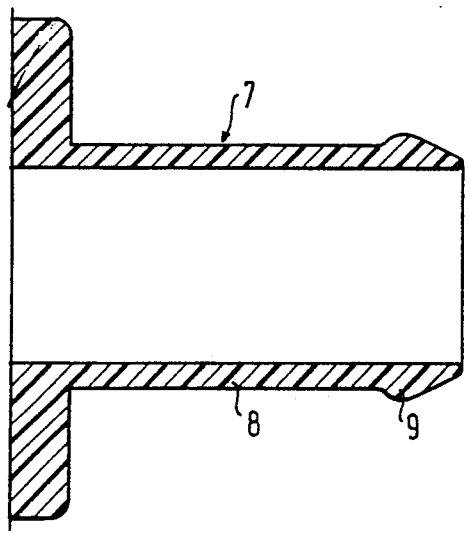
FIG. 1 is a longitudinal cross-sectional view through a junction piece to be connected with a clamping connector according to the invention.
Figure 2:
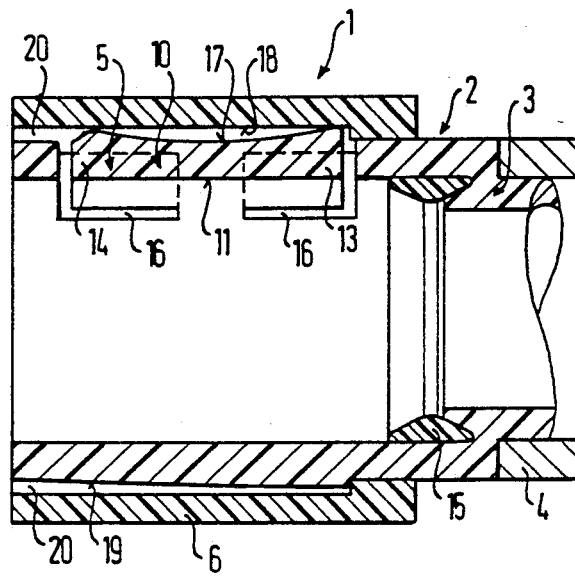
FIG. 2 is a longitudinal cross-sectional view of the clamping connector according to the invention prior to insertion of the junction piece shown in FIG. 1.
Figure 3:
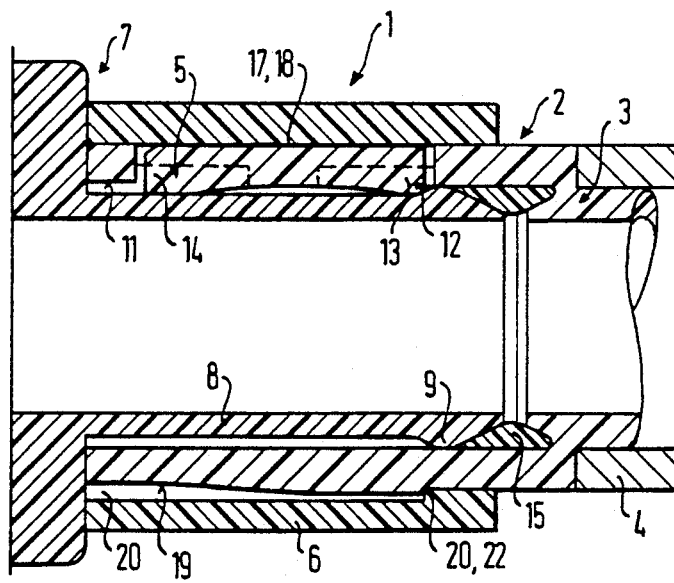
FIG. 3 is a longitudinal cross-sectional view showing the fully assembled clamping connector and junction piece.

Referring more particularly to the drawings wherein the showings are for the purpose of illustrating preferred and alternate embodiments of the invention only, and not for the purpose of limiting same, FIGS. 1 through 3 show the overall arrangement of a clamp type connector assembly particularly suited for joining sections of tubing or hose and generally comprising a clamping conductor element 1 which cooperates with a junction piece 7 to releasably join two hose or tube components in a fluid tight manner. As shown in FIG. 1, the junction piece 7 includes a hollow, cylindrical section s which provided at its front or right-hand end (as viewed in FIG. 1) with a circumferentially extending rib enlarged bulge portion 9 that tapers to a thin, narrow terminal end. In this example, the opposite terminal end zone of the junction piece 7 is shown as being in the form of a flange but can, of course, have many different constructions and be joined to other components or tubular members in any convenient manner.

Referring to FIG. 2, the clamp connector formed according to the invention basically comprises a sleeve-shaped central body element 2 and an externally mounted clamping sleeve element 6 which is rotatable about the longitudinal center axis. As can be seen, the sleeve-shaped central body element 2 has a first terminal zone 3 which provides means for connecting it to a related tube or hose such as the tube-shaped component 4. The tube-shaped component or part 4 is shown only schematically in FIGS. 2, 3, and 6.

A second terminal zone 5 of the sleeve-shaped element 2 carries a pair of oppositely disposed circumferentially spaced locking pieces 10 which are located in the area of the inner wall 11 and which can be actuated by way of the rotatable clamping sleeve 6. For reasons which will subsequently become apparent, the upper or external sides 17 of the two locking pieces 10 are convex or dish like in shape and are located between a terminal zone 13 and a terminal zone 14. The details and constructional relationships of the sleeve-shaped part 2 can be more fully understood by reference to FIGS. 6 and 7.

Figure 6:
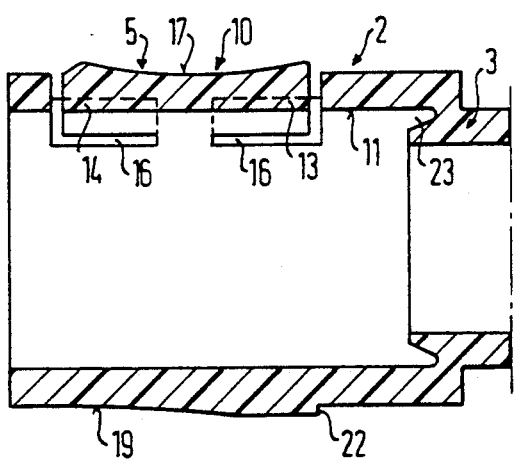
FIG. 6 is a cross-sectional view taken on line VI—VI in FIG. 7 showing the sleeve-shaped element with the clamping sleeve removed.

At the interior end of the first terminal zone 3, the sleeve-shaped element 2 carries a circumferential groove 23 (see FIG. 6). Embedded or located in the circumferential groove 23 is a resilient sealing ring 15 as shown in FIGS. 2 and 3. Ring 15 is designed either as a single component that is resiliently placed in the groove 23 or, alternatively, there exists the possibility that sealing ring 15 can be produced simultaneously with the sleeve-shaped element 2 by use of the conventionally and well known two component injection molding process. That is, the sealing ring 15 can, if desired, be molded directly in place during the injection molding operation used for forming the component 2.

FIG. 3 illustrates the clamping connector formed according to the invention after it has been assembled with the junction piece 7. As can be see therein, junction piece 7 is inserted into the clamping connector 1 such that the hollow, cylindrical portion 8 is embedded in the inner wall 11 of the sleeve-shaped element 2. The end of the junction piece 7 comes into engagement with the sealing ring 15. Note that the rib or bulge 9 and, in particular its tapered interior side, acts upon the sealing ring and firmly engages therewith to establish a fluid tight connection. The components are maintained in this engaged fluid tight relationship through rotation of the clamping sleeve 6.

Figure 4:
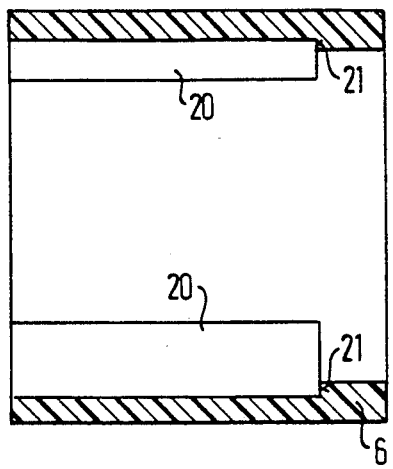
FIG. 4 is a longitudinal cross-sectional view through the clamping sleeve portion of the connector.
Figure 5:
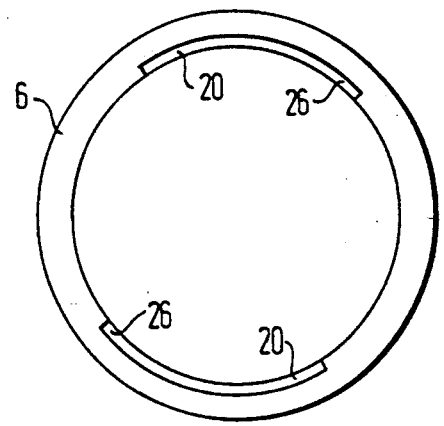
FIG. 5 is an end of the left end of the clamping sleeve shown in FIG. 4.

As best seen in FIGS. 3, 4, and 5, the clamping sleeve 6 is arranged to surround the sleeve-shaped element 2 in closely spaced relationship therewith and has wall parts positioned to act upon the two marginal zones 13 and 14 of the locking pieces 10. Note that the clamping sleeve engages at the outer side in the dish-shaped region 17 of the locking piece 10. The arrangement is such that rotation of the clamping sleeve 6 has the effect by way of a type of "click-in" effect which drives the two terminal zones 13 and 14 radially inward to reverse the dish-like shape 17. As can be seen, the terminal zone 13 engages behind the bulge 9 of the junction piece 17 and thereby forms a lock to hold junction piece 17 tightly in position. The other terminal zone 14 is positioned at an axially spaced location and engages the outer circumference of the hollow cylindrical portion 8 to thereby stabilize the junction piece against radial or lateral movement. This completes the installation and the clamping connector 1 thus tightly and functionally connects the junction piece 7 with the tube-shaped part 14.

The details and preferred structural arrangement of the clamping sleeve 6 can best be seen in FIG. 4. As illustrated therein, the clamping sleeve carries internal oppositely disposed recesses 20. The relative circumferential measurements of the recesses 20 are adapted to the circumferential length of the locking parts 10 of the sleeve-shaped element 2. In the subject embodiment, the length of the recesses 20 are substantially equal in length to the circumferential span of the locking parts 10 plus the width of insertion slants 19. The recesses 20 have zones 26 which are sized and arranged for the purpose of accepting the insertion slants 19 which are best illustrated in FIGS. 6 and 7 of the sleeve-shaped element 2.

Figure 7:
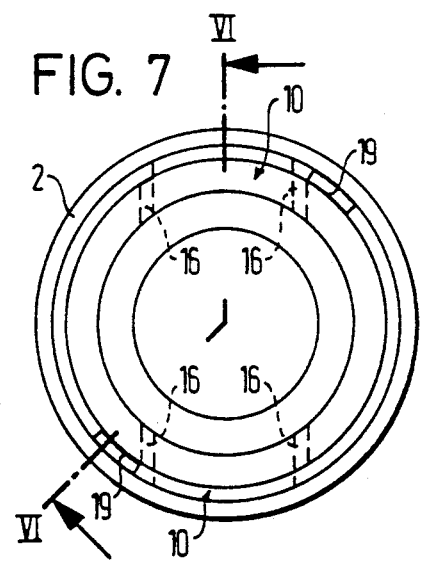
FIG. 7 is an end view of the clamping connector taken on line VII—VII of FIG. 2.

As shown in FIGS. 6 and 7, there are two diagonally opposite locking pieces 10. To form these locking pieces 10, the wall il of the sleeve-shaped element 2 has L-shaped undercuts on opposite sides. The upper side 17 of the respective undercut zone is, as illustrated in FIGS. 2 and 6, convex in the form of a dish. Furthermore, the sleeve-shaped element exhibits the previously-mentioned insertion slants 19 which, as best shown in FIG. 7, are arranged closely adjacent to the locking pieces 10.

The length of the previously-mentioned recesses can be seen in FIG. 5 and each has a circumferential length which corresponds to the circumferential length of the associated locking piece 10 and its neighboring insertion slant 19. The axial inner ends of each of the recesses 20 form a terminal zone with shoulders 21.

For pre-mounting the clamping sleeve with the sleeve-shaped element 2, the clamping sleeve is pushed over the first terminal zone 5 of the sleeve-shaped element 2 until the shoulders 21 at the ends of recesses 20 of clamping sleeve 6 engage axially behind the resilient regions 13 of the two locking parts 10. In order to facilitate the assembly, there are the previously-noted diagonally opposite insertion slants 19 of the sleeve-shaped element 2 which embed themselves in the areas 26 of recesses 20 of clamping sleeve 6. After completion of the pre-mounting of clamping sleeve 6 on the sleeve-shaped element 2, the relationship is as shown in FIG. 2.

As can be appreciated, the first terminal end zone 3 of the sleeve-shaped element can have many different designs. The only requirement is that it be such that it can be tightly connected with any related tube-shaped part or hose 4 or any other component to which the connector body is to be joined.

Figure 8:
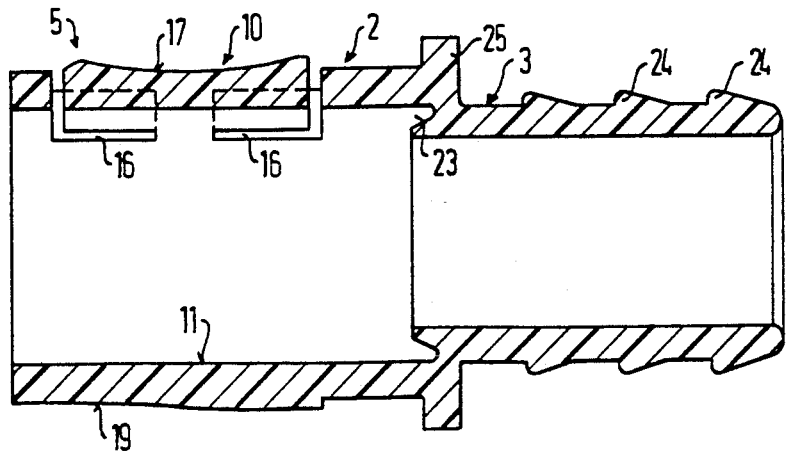
FIG. 8 is a longitudinal cross-section of a modified form of the sleeve-shaped element (the view is similar to FIG. 7)

FIG. 8 shows another form for the first terminal zone 3. As shown in FIG. 8, the terminal zone 3 is in the shape of a hollow cylinder with a plurality of circumferentially extending holding flanges or bulges 24 arranged to engage tightly within the associated tube-shaped part 4. This design is commonly known for use in various types of hose connector components. In this embodiment, a shoulder 25 may be provided in the interior portion of the terminal zone 3. The flange 25 can function to allow a further fastening element, such as an overlying sleeve or collar can be added to compress the hose into engagement with the end 3 and embed itself behind the shoulder 25.

A further embodiment of the invention is shown in FIG. 9 which illustrates a further possible modification of the junction piece 7. In this arrangement, the portion to the right of the bulge or circumferential rib 9 is given a hollow, cylindrical shape. The arrangement of FIG. 9 is particularly suited to joining with a clamping connector of the type shown in FIG. 10. As shown therein, the sealing ring can be designed as an O-ring 31. In this arrangement, the O-ring 31 positions itself in a correspondingly designed groove 23, of the sleeve-shaped element 2. Once again, the possibility exists that sealing ring 31 is designed as a single component or can be produced by the two component extrusion process together with the sleeve-shaped element 2 as previously mentioned.

FIG. 11 illustrates how the clamping connector of FIG. 10 can be joined with the junction piece as illustrated in FIG. 9. Note that the hollow cylinder 30 of the junction piece 7 which extends forwardly beyond the bulge 9 acts radially upon the O-ring 31. This assures an excellent fluid seal.

An alternative arrangement is illustrated in FIG. 12. In this arrangement, the O-ring 31 is positioned at a location such that it is engaged radially by the cylindrical piece 30 and also axially by the bulge 9. This can, under certain circumstances, improve the sealing effect. The examples and modified constructions shown in FIGS. 10 through 12 also illustrate how the shoulder 25 of the sleeve-shaped element 2 can be grabbed and engaged by a flange 32 of a circumferential overlying fastening sleeve so that the tube-shaped part 4 experiences thereby a tight and secure connection with the sleeve-shaped element 2.

Overall, the subject invention provides a functionally safe and simply constructed clamping connector which does not only tightly join together the parts that are to be connected but also stabilizes them in their position relative to each other.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a releasable tube connection made of plastic including a sleeve-shaped central body having a first end connectable with a tube-shaped part and a second end axially receiving a junction piece having a circumferentially extending clamping rib and a rotatable clamping sleeve encircling the second end of the central body, the improvement wherein the central body includes at least two radially deflectable resilient locking tabs with cam surface means on the interior of the clamping sleeve for selectively deflecting the locking tabs radially inward to engage the junction piece, a first of the tabs located to engage closely adjacent the clamping rib to prevent axial withdrawal of the junction piece and a second of the tabs located at a position axially spaced from the first said tab to radially position and stabilize the junction piece in the central body.

2. A releasable tube connection as defined in claim 1 wherein the central body carries a seal ring positioned to sealingly engage the junction piece circumferentially thereof.

3. A releasable tube connection as defined in claim 2 wherein the seal ring is bonded to the central body.

4. A releasable tube connection as defined in claim 2 wherein the junction piece comprises a hollow cylinder having a terminal end which is received in the central body, the terminal end engaging the seal ring.

5. A releasable tube connection as defined in claim 4 wherein the clamping rib extends circumferentially about the junction piece closely adjacent the terminal end.

6. A releasable tube connection as defined in claim 2 wherein the seal ring is positioned in a circumferential groove formed in the central body.

7. A releasable tube connection as defined in claim 2 wherein the sealing ring is of triangular shape in cross section.

8. A releasable tube connection as defined in claim 1 wherein the locking tabs are formed integrally with the central body by axially spaced cut-out portions with the central body having a concave shape between the cut-out portions when the locking tabs are in their radial outer position.

9. A releasable tube connection as defined in claim 1 wherein the central body includes at least two inclined outer surface portions which engage the interior of the clamping sleeve to facilitate assembly of the clamping sleeve to the central body.

10. A releasable tube connection as defined in claim 1 wherein the inclined outer surface portions are closely adjacent the locking tabs.

11. A releasable tube connection as defined in claim 1 wherein the clamping sleeve has internal recesses which form a portion of the cam surface means.

12. A releasable tube connection as defined in claim 11 wherein the internal recesses have a predetermined circumferential length which corresponds to the circumferential length of a locking tab and an adjacent one of the inclined outer surface portions of the central body.

13. A releasable tube connection as defined in claim 11 wherein the internal recesses in the clamping sleeve form shoulders which engage end portions of the locking tabs and the inclined outer surface portions of the central body to limit axial movement of the clamping sleeve.

14. A releasable tube connection as defined in claim 1 wherein the first end of the central body is of hollow cylindrical configuration.

15. A releasable tube connection as defined in claim 14 wherein the first end of the central body includes at least one circumferential rib.

16. A releasable tube connection as defined in claim 1 wherein the central body has a radially extending, circumferential flange between the first end and the locking tabs.

17. A releasable tube connection as defined in claim 1 wherein the seal ring is an O-ring.

18. A releasable tube connection as defined in claim 17 wherein the junction piece has a cylindrical end portion which engages radially within the O-ring.

19. A releasable tube connection as defined in claim 18 wherein the clamping rib and the cylindrical end portion of the junction piece both engage the O-ring.

* * * * *